United States Patent [19]

Miyasaka et al.

[11] Patent Number: 5,515,144
[45] Date of Patent: May 7, 1996

[54] APPARATUS FOR DISPLAYING IMAGE INFORMATION RECORDED ON A DOCUMENT AND ANY MODIFIED DATA ADDED THERETO

[75] Inventors: Toru Miyasaka, Hitachi; Kozo Nakamura, Hitachioota; Takao Umeda, Mito, all of Japan

[73] Assignee: Hitachi, Ltd., Tokyo, Japan

[21] Appl. No.: 109,644

[22] Filed: Aug. 20, 1993

[30] Foreign Application Priority Data

Aug. 21, 1992 [JP] Japan .................. 4-222506
Aug. 21, 1992 [JP] Japan .................. 4-222507

[51] Int. Cl.⁶ .................................... G03G 15/14
[52] U.S. Cl. .................. 355/271; 355/200; 355/202; 358/452
[58] Field of Search .................... 358/296, 300, 358/302, 452, 453, 450, 400, 401, 496; 359/41, 51, 52, 98; 355/208, 271, 209, 205, 207, 204, 203, 202, 200, 211, 212, 210; 345/87, 901, 173, 179

[56] References Cited

U.S. PATENT DOCUMENTS

| | | | |
|---|---|---|---|
| 4,322,155 | 3/1982 | Lopata | 355/210 |
| 4,335,955 | 7/1982 | Lopata | 355/212 |
| 4,541,706 | 9/1985 | Kishi | 355/212 X |
| 4,734,789 | 3/1988 | Smith et al. | 345/173 X |
| 4,771,336 | 9/1988 | Ohtorii | 358/452 |
| 4,799,083 | 1/1989 | Knodt | 355/200 X |
| 4,807,041 | 2/1989 | Kishi et al. | 358/452 |
| 4,851,875 | 7/1989 | Tanimoto | 355/211 X |
| 4,918,723 | 4/1990 | Iggulden et al. | 358/452 X |
| 4,965,744 | 10/1990 | Wagatsuma et al. | 358/452 X |
| 4,972,496 | 11/1990 | Sklarew | 345/901 X |
| 5,130,834 | 7/1992 | Kano et al. | 359/98 X |
| 5,153,737 | 10/1992 | Kobayashi | 358/450 X |
| 5,172,164 | 12/1992 | Fujiwara et al. | 355/202 X |
| 5,264,904 | 11/1993 | Audi et al. | 355/205 X |
| 5,289,570 | 2/1994 | Suzuki et al. | 358/450 X |
| 5,293,534 | 3/1994 | Mihara | 345/87 X |
| 5,352,552 | 10/1994 | Maruyama et al. | 355/211 X |

FOREIGN PATENT DOCUMENTS

| | | | |
|---|---|---|---|
| 5-165026 | 6/1993 | Japan | 345/87 |
| 2193023 | 1/1988 | United Kingdom . | |

*Primary Examiner*—A. T. Grimley
*Assistant Examiner*—Shuk Y. Lee
*Attorney, Agent, or Firm*—Antonelli, Terry, Stout & Kraus

[57] ABSTRACT

In order to edit print information, the print information from a memory may be printed on a sheet by a printing arrangement and the sheet transported to a window at which the sheet is supported so that it is aligned with an editing unit and an editing display. Editing data are then input via the editing unit and are displayed by the editing display so that the editing data appear in the window at the same position as the part of the print information to be edited. At the same time the information in the memory may be changed in accordance with the editing. In this way, the print information can be displayed clearly, and the editing data input quickly. The sheet may be paper but may also be a composite film having low molecular weight liquid crystal material dispersed in high molecular weight material such as high molecular weight liquid crystal material.

40 Claims, 12 Drawing Sheets

| Insertion | ⬜ | Area |
|---|---|---|
| Erasure | ⭕ | Area |
| Moving | ✕ | Editing and erasure |
| Copying | φ | Execution |
| Substitution | ϙ | Re-projection |

| Insertion | ∨ | |
| Erasure | = | |
| Moving | ↗ | |
| Copying | ⇗ | |
| Substitution | ↔ | |

APPARATUS FOR DISPLAYING IMAGE INFORMATION RECORDED ON A DOCUMENT AND ANY MODIFIED DATA ADDED THERETO

BACKGROUND OF THE INVENTION

1. Field of the Invention

The present invention relates to a document processing apparatus, and in particular to the processing of a page carrying printed information such as letter and/or number characters and/or images. The present invention also relates to a facsimile apparatus incorporating such a document processing apparatus.

2. Summary of the Prior Art

In a word processing system, characters or other images may be input into a computer, and displayed on a screen (CRT) to enable the user to edit or otherwise to change the displayed information. That editing is normally carried out using the keyboard, or by a mouse. It is also known to input data to the computer via an optical scanner which can scan a printed document. If a permanent record of the data is needed, the data may be printed on a sheet of paper by transmitting the data from a computer to a suitable printer.

Data may also be input to a computer via a data pad, which has a pen that is movable over the surface of the pad, with the position of the pen being recorded to generate the data. When connected to a computer system, the data may then be displayed on the screen of the system.

In such a word processing system, information is displayed on a screen unless a permanent record is wanted. However, such on-screen display has the disadvantages that the resolution of the display is low, and it is often tiring for the operator to look at such a screen for a prolonged period. Furthermore, such screens usually present only a limited part of a page of a document.

While the document can be, and often is, printed, editing of the printed document by marking the printed sheet then requires the editing to be re-entered into the word processing system via e.g. the keyboard. Thus, effectively, two separate editing operations are carried out. This problem is increased when two or more people wish to edit the document, particularly if editing is to occur at remote sites. While it is possible to print the document at one site, to transmit it to another site for editing, and then return the edited document to the first site for re-entering of the editing into the wordprocessing system, this is troublesome even when use of a facsimile transmission is made.

In wordprocessing systems, the data represents characters to be printed. However, the same problems occur when the data represents images.

SUMMARY OF THE PRESENT INVENTION

Therefore, according to a first aspect of the present invention, it is proposed that a recording sheet can have information printed thereon, which print information is also stored as print data in a suitable memory. The sheet is supported in a window, and editing data can be input by a suitable editing unit. Then, an edit display associated with the window displays the editing data, and at the same time the data in the memory is also changed.

Thus, according to the present invention, the text to be edited is displayed on a sheet, so that a static image of high resolution can be achieved. The sheet is not tiring to look at, and, when editing data is input, it is displayed at part of the window, so that the editing data and the original data on the sheet are displayed together. The effect is thus similar to writing on a sheet, but the effect is achieved electronically. Thus, it is not necessary to re-enter the editing data to change the content of the memory; instead the content of the memory is changed at the same time the editing data is input and displayed.

In a first development of this aspect of the present invention, the sheet is capable of having both the print information printed thereon, and having that print information erased. Thus, rather than needing one or more sheets to be printed each time data is to be edited, the same sheet may be re-used. In practice, it is preferable that the re-using of a sheet in this way is on the basis that the apparatus has a store containing a plurality of sheets, so that the sheets can be removed successively from that store, and the print information printed thereon. Then, normally, the print information can be erased after the input of the editing data, and the sheet re-used. However, if a final version has been achieved, the sheet can be output from the apparatus.

Such outputting of a sheet may also be necessary if repeated re-using of the sheet occurs. Such repeated re-using increases the risk of the sheet becoming stained, and therefore a sheet that has been used many times will need to be discarded. The discarding of a sheet in this way may be achieved by detecting staining of any given sheet and discarding that sheet, or by counting the number of times a given sheet is used, and discarding the sheet when it has been used more than a predetermined number of times.

The above discussion assumes that the print data is input to the memory, and the memory then controls the printing of the print information on the sheet corresponding to the print data. Thus, for example, in a wordprocessing system the data can be input to an apparatus according to the present invention by e.g. a keyboard, and stored in the memory. Then, if the print data is to be edited, it is printed on one or more sheets which is passed to the window, and the data edited and a display of the editing data displayed at the window in conjunction with the sheet. At the same time, the data in the memory is also edited. However, it is also possible within the present invention to provide a scanner which can scan print information on a sheet, and transmit that print information as print data to the memory. Thus, to edit an already printed sheet, the printed sheet is input to the apparatus and scanned to generate the print data in the memory. Then, the sheet is transported to the window for editing, and the data in the memory is then changed.

In a further development of the present invention, the sheet is in the form of an endless belt. The belt passes successively through a print means, the window, and an erase means. Thus, the print information corresponding to print data can be printed on a part of the belt, transported to the window for editing, and subsequently erased. The belt can be used many times, thereby eliminating wasted sheets. Again, it may be desirable to monitor the amount of use of the belt. Thus, the belt may be replaced if a stain is detected, or if the belt has been used more than a predetermined number of times.

The sheet or sheets used in the present invention may be of paper, so that the present invention can replace a standard wordprocessor and printer. However, advantages are obtained if the sheet or sheets is of a low molecular weight liquid crystal material, dispersed in a high molecular weight material, preferably a high molecular weight crystal material.

Liquid crystal displays are known in which such a sheet is fixedly mounted between electrodes, and the electric fields generated by such electrodes then affect the transmission of light through the sheet. However, it is now proposed that the sheet is not fixed to the electrodes but is removable therefrom. Hence, electrodes may be used to print on the sheet, and then the sheet transported to the window to enable the print information thereon to be edited. The sheet may then be passed to a suitable erase means.

It should be noted that the use of such a sheet represents a second, independent, aspect of the present invention. In that aspects a sheet of low molecular weight with crystal material dispersed in a molecular weight material is used in conjunction with print means and means for removing the sheet from that print means. Since the present invention is primarily concerned with the generation of static displays, it does not matter that the sheet is removed from the print means.

If the sheet is of a low molecular weight liquid crystal material discussed in a higher molecular weight material, it is preferable that such a sheet has a protective film on one or both surfaces thereof, to protect the sheet, and the sheet may incorporate colouring material so that coloured images may be generated. In order to record on the sheet, a charge or voltage pattern is established by a suitable printer means, and the print information thus generated may be erased either by applying a charge or voltage pattern of reverse polarity, or by applying an alternating voltage to the sheet.

As has previously been mentioned, the window displays the print information on the sheet and the editing data, the latter being displayed via the editing display. That editing display may be a liquid crystal display, or a CRT display. In either case, the sheet should be translucent, more preferably transparent since then the editing display will be immediately visible through the sheet. Alternatively, particularly when the editing display is a liquid crystal display, it could overlie the sheet since the sheet would then be visible through the liquid crystal display except at the location of editing data on the liquid crystal display.

For inputting the editing data, the editing unit may comprise a transparent tablet which overlies the sheet when the sheet is at the window, a pen, and means for detecting the location of the pen relative to the transparent tablet. Thus, by moving the pen on the transparent tablet, editing data may be generated. The transparent tablet is preferably then located over the sheet at the window. Alternatively, the editing means may comprise a keyboard separate from the window. In either case, the editing data is displayed at the window, in immediate conjunction with the printed information on the sheet.

In a further aspect of the present invention, editing data may be written directly on the sheet. Then, it is necessary to scan the sheet to read the editing data, to enable the print data in the memory to be changed. Therefore, in a third independent aspect of the present invention, a print means can print information on a sheet, the sheet can then be edited, the sheet scanned can generate the editing data, and then the sheet can be erased. This arrangement is found particularly advantageous when the sheet is a composite film having low molecular weight liquid crystal material dispersed in high molecular weight material.

The present invention provides a document processing apparatus which permits printing of print information on a sheet. The present invention is also applicable to a facsimile apparatus, in which the document processing apparatus is combined with transmission means for transmitting the print data from the memory and a remote location. Thus, a facsimile system may be used to read information from a sheet at a remote site, and transmit it to a sheet processing apparatus according to the present invention for editing. Alternatively, edited print data may be transmitted from the memory to a remote site.

BRIEF DESCRIPTION OF THE DRAWINGS

Embodiments of the present invention will now be described in detail, by way of example, with reference to the accompanying drawings, in which:

FIG. 8 shows alternative editing command symbols which may be used in conjunction with the embodiments of FIGS. 1 to 4;

DETAILED DESCRIPTION

Figure 1:
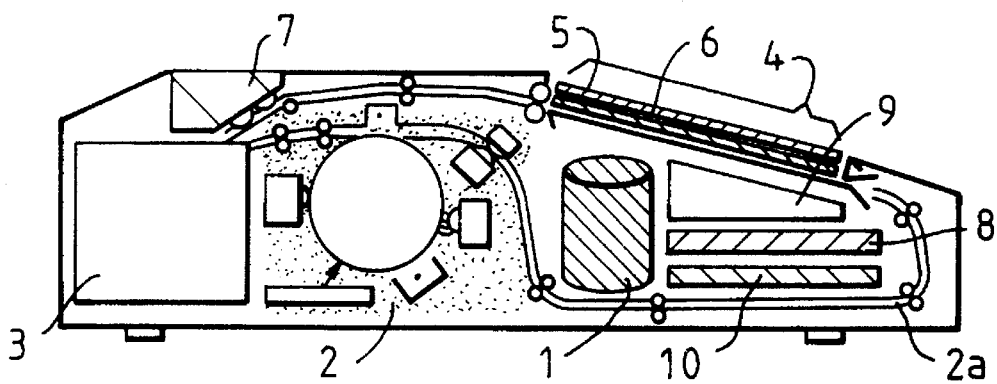
FIG. 1 shows a document processing apparatus as a first embodiment of the present invention.

Referring to FIG. 1, a first embodiment of the present invention will now be described.

FIG. 1 illustrates the construction of a document processing apparatus embodying the present invention. In FIG. 1, print data, corresponding to text and/or an image, is read by external data equipment, and is received (the reception means is not shown) and stored in an image data memory 1. The print data is then printed by a print mechanism 2 as printed information on a recording sheet fed from a recording sheet stacker 3. Transport means 2a transports the sheet from the stacker 3 to the print mechanism 2.

The recording sheet carrying the information recorded in conformity with the information in the image data memory 1 is conveyed by the transport means a to a display section (window) 4. The window 4 has associated therewith a transparent tablet 5 and a transparent electronic image display 6 such as EL or liquid crystal, these being stacked. When editing data for the image is supplied to the transparent tablet using an electronic pen or the like, the editing data thus supplied is displayed on the electronic image display 6. If no error is found in the information thus displayed, the data in the memory 1 is altered by giving an image information renewal instruction and the recording sheet before correction is sent to a recording image erasing means 7. Simultaneously, a new recording sheet is fed from the recording sheet stacker 3 and the altered information in the image data memory is projected for recording purposes and this recording sheet is conveyed to the window 4. The recording sheet sent to the recording image erasing means 7 is returned to the recording sheet stacker 3 after the image thereon is erased. The recording image erasing means 7 can be prepared by soaking a moisture absorptive member such as cloth with an alcoholic solvent and rubbing it against the recording sheet to be erased. In this case, however, a recording sheet to be selected should be formed of material which is unaffected by the solvent being used (e.g., ethyl alcohol is used as the erasing solvent and the sheet is of polyethylene resin).

FIG. 1 also shows (in schematic form) the control components of the document processing apparatus. The transparent tablet 5, which will be described in more detail later, is controlled by a first control unit 8, the transparent electronic image display 6 is controlled by a second control unit 9, and the transmission of editing data to the memory 1 is controlled by a third control unit 10.

Figure 2:
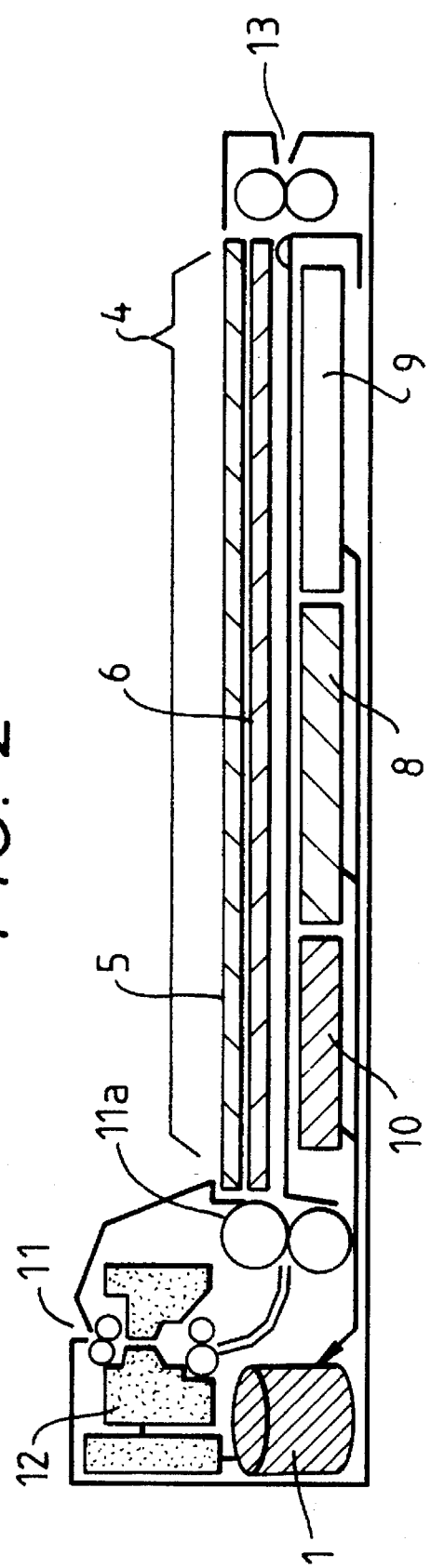
FIG. 2 shows a document processing apparatus as a second embodiment of the present invention.

FIG. 2 illustrates another embodiment of the present invention. Components of the embodiment of FIG. 2 which correspond to components of FIG. 1 are indicated by the same reference numerals.

In FIG. 2, paper carrying recorded image information is fed from a sheet inlet 11. The paper thus inserted passes through an image information read unit 12 (scanning means) so that the image recorded on the paper is stored as electronic data in the image data memory 1. Paper which has passed through the read unit is conveyed to a window 4 by a suitable transport means 11a. As in the first embodiment the window 4 has associated therewith a transparent tablet 5 and a transparent electronic image display 6 such as EL or liquid crystal, these being stacked.

When editing information for the image is supplied to the transparent tablet 5 using an electronic pen or the like, the editing information thus supplied is displayed on the electronic image display 6. The image information in the image data memory 1 is altered by giving an image information renewal instruction and the paper is discharged from an outlet 13. In this case, it is possible to transmit the contents of the image data memory 1, including the editing information via a communication means (to be discussed later) to another data processing apparatus, to record information from another document processing apparatus in the image data memory and to display the information on e.g. a transparent tablet of that other apparatus. In other words, information can be freely exchanged with another sheet processing apparatus, or indeed other devices which can make use of the data.

Although cut sheets are used as recording sheets in the embodiment of the present invention shown in FIG. 1, use of a recording sheet in the form of an endless belt can enable the sheet stacker 3 to be omitted. Moreover, not only recording paper but also a projected recording image in the display section 4 can be conveyed and positioned with precision.

Figure 3:
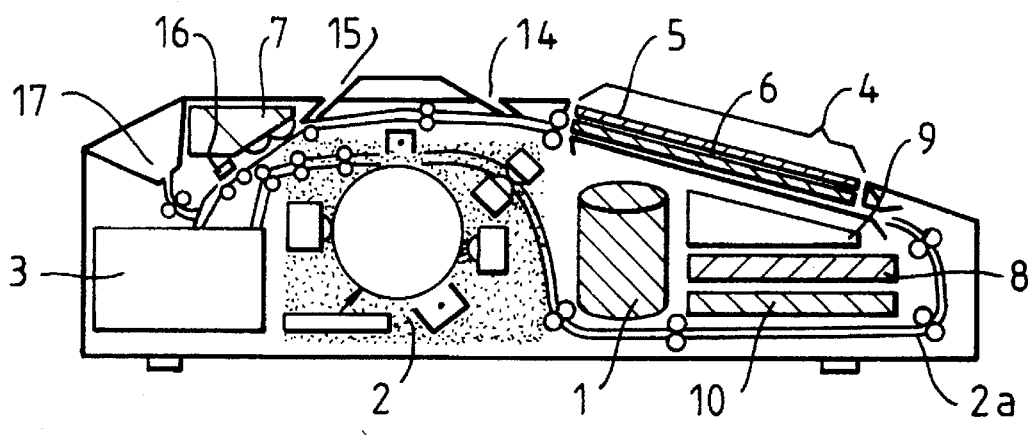
FIG. 3 shows a document processing apparatus as a third embodiment of the present invention.

In the embodiment of FIG. 1, the sheets are withdrawn from the stacker 3, and after use, returned thereto. When a final version of the text is arrived at, however, it is desirable that the sheet carrying the edited information can be discharged from the document processing apparatus. This is shown in the embodiment of FIG. 3, which corresponds generally to the embodiment of FIG. 1 and the same reference numerals are used to indicate corresponding components. In the third embodiment shown in FIG. 3, there is a sheet discharge outlet 14 from which a sheet carrying information thereon can be discharged. Furthermore, in the embodiment of FIG. 3, there is an inlet 15 to allow such a sheet to be returned to the apparatus, and the information thereon erased so that the sheet can be returned to the stacker 3.

When recording sheets are used repeatedly, they may become stained and this deterioration poses a problem. Therefore, in the third embodiment of FIG. 3, stains on the sheet are detected by an optical density sensor 16. When staining exceeding a predetermined amount is detected, a recording sheet replacement signal is issued. Alternatively, a recording sheet replacement signal is issued after the sheet is used a predetermined number of times (counted e.g. by the third control means 10).

In a system in which the sheet can be discharged from the apparatus, an unerasable recording method may be used to record the number of times each sheet is used so that the sheet may be discharged by detecting when the sheet has been used a predetermined number of times. An example of the unerasable recording method, is to make small punched holes in the edges of the recording sheet. Alternatively, a magnetic memory may be provided in a part of the recording sheet or data of the number of times each sheet is used may be completely fixed. In a system in which cut sheets are used as recording sheets, a sheet which is considered to be unusable is discharged into a discharge tray 17. The recording sheet thus discharged may then be destroyed.

Figure 4:
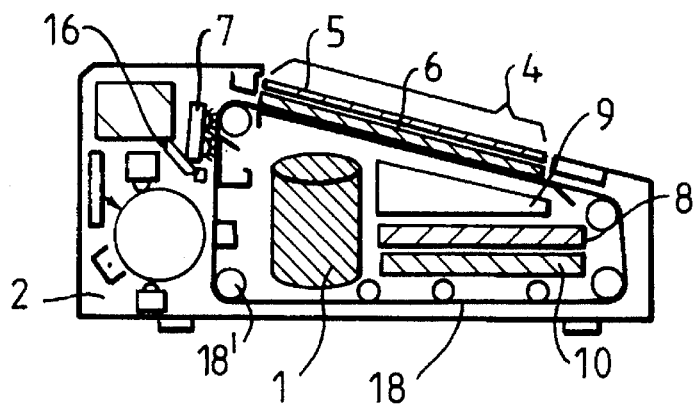
FIG. 4 shows a document processing apparatus as a fourth embodiment of the present invention.

FIG. 4 illustrates a fourth embodiment of the present invention, which uses a recording sheet in the form of an endless belt. With this arrangement in which the recording sheet is never discharged from the apparatus, only a small degree of fixation of the projected recording image to the recording sheet is required and an image obtained by electrophotography can be used without fixation. In addition, a simple implement such as a rotatable cleaning brush or the like may be used as an erasing means.

Thus, in the fourth embodiment of FIG. 4, an endless belt 18 is driven by suitable drive means in the form of the drive roller 18', and is mounted so that it extends between the printing mechanism 2, the window 4 and the erase means 7. These components, and indeed the other components of the fourth embodiment may be generally similar to those of the third embodiment and the same reference numerals are used to indicate corresponding parts. As in the third embodiment, an optical density sensor 16 may be provided in order to detect staining of the endless belt 18. When such staining is detected, the endless belt 18 is replaced. Alternatively, the number of full rotations of the endless belt 18 may be counted (e.g. by the third control means 10) and a belt replacement signal generated when the endless belt 18 has been used a predetermined number of times.

Figure 5:
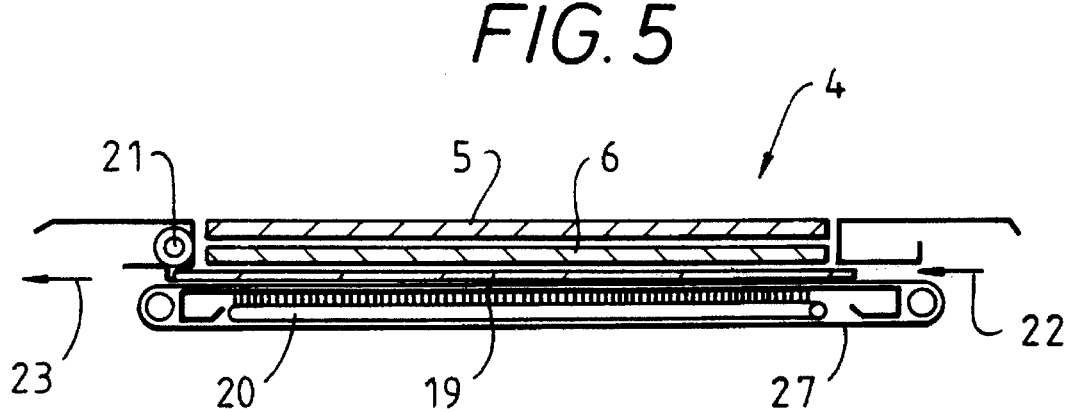
FIG. 5 shows part of the embodiments of FIGS. 1 to 4 in more detail.

FIG. 5 shows in detail the window 4 and the components associated therewith and this will now be described in detail. The top component is the transparent table 5, below which is the transparent electronic image display. An endless belt receives a sheet 19 from the transport means 2a in the direction of arrow 22, and then supports that sheet 19 below the window 4. Since the sheet 19 has to be positioned accurately relative to the window 4, a stopper 21 may be provided for determining the stop position of the sheet 19. Once editing of the information on the sheet 19 has been carried out, the sheet is transported away from the window 4 in the direction of arrow 23, e.g. to the erase means 7 shown in FIG. 1.

The transparent tablet 5 acts as an editing unit for inputting edited data, and an electromagnetic pen (not shown in FIG. 5) is moved over the transparent tablet 5, with the position of that pen relative to the table 5 being monitored, to generate editing data which may then be transmitted to the memory 1 in FIG. 1. Alternatively, an ultrasonic table or the like may be used to form the editing unit for the edited data. The electronic image information display 6 is preferably a liquid crystal or EL display, since this has the advantage that it is readily re-writable, and a high resolution can be generated. However, it is then preferable to provide a suitable light source 20, and to use a translucent sheet 19, so as to provide back-lighting of the transparent electronic image display 6 so that the editing data thereon can be seen clearly. Alternatively, the sheet 19 may be transparent, which is then itself back-lit by the light source 20.

Figure 6:
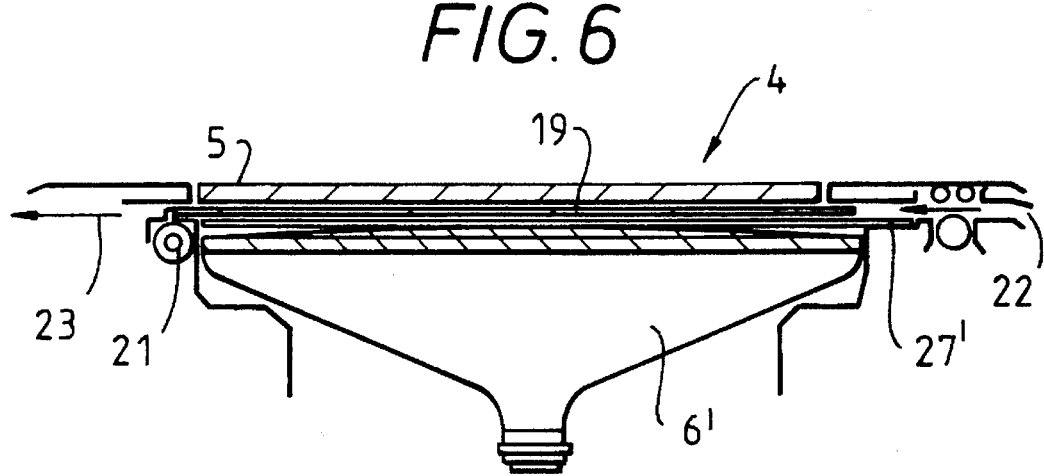
FIG. 6 shows a modification of the part shown in FIG. 5.

If a transparent sheet 19 is used, it then becomes possible to use an editing display in the form of a CRT 6' position below the sheet 19. This is shown in FIG. 6. The sheet 19 is supported on a transparent plate 27', and the editing information is displayed on the CRT 6' and will thus be visible in the window 4 through the sheet 19. The transparent tablet 5 may be the same as in the arrangement of FIG. 5. This arrangement has the advantage that the CRT 6' is less expensive than a liquid crystal. However, if desired a liquid crystal may be mounted below the transparent plate 27', replacing the CRT 6'.

If a transparent recording sheet with a projected record and a transparent electronic image information display is used, a coordinate input means may be arranged at the bottom of the stacked components in the window 4 and this makes it possible for the editing unit for inputting edited data to use a pressure sensor array. If more than one of the coordinate input unit, the electronic image information display and the recording sheet are made thin and phototransmissive, various combinations may then be employed.

Moreover, as will be discussed in more detail later, a polymer dispersed liquid crystal display may be used as the recording sheet carrying an erasable record. This allows integration of the writing and erasing means. Consequently, the apparatus itself may be made simple in construction as image information is recordable on a sheet by applying a voltage pattern corresponding to the image information, inversely-polarized voltage pattern is applied when the sheet is to be erased.

To input two-dimensional coordinates on a recording sheet with a projected record, it is possible for a cursor (e.g. + or ←) to be displayed on the electronic image information display above the recording sheet 19 and by moving the cursor using a mouse or track ball, two-dimensional coordinates may be designated. The input of edit data can thus be accomplished without use of a transparent tablet. Another way of simplifying the arrangement is to position a recording sheet in the display section and uses a pen to write editing information directly onto the recording sheet. After editing in this manner, the sheet is transported to an image read unit which then reads the information so that the data in the image data memory is rewritten according to the editing information thus written. Nevertheless, it is difficult to apply the latter method to the field of communication conferences which require instantaneous processing since the information thus written cannot quickly be converted into electronic data.

Figure 7:
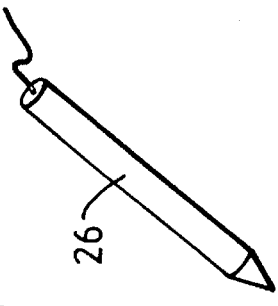
FIG. 7 shows the appearance of an edited sheet in the embodiments of FIGS. 1 to 4.

FIG. 7 shows the effect that is achieved by the present invention. A sheet 18 or 19 is visible through the window 4, with that sheet 18 or 19 being covered by the transparent table 5 and the transparent electronic image display 6. A group of editing command input switches 24 are then provided adjacent the window 4, so that different editing operations can be carried out by generating various editing commands from the respective input switches 24.

The editing commands may include e.g. insertion, deletion, moving, substitution, execution, erasure by editing, re-projection, or discharge. The editing operation is performed by selecting one of the commands and specifying coordinates for the editing on the projected recording image by means e.g. of a pen 26. Although it may be considered necessary to confirm that the range of designation as the projected recording image is extremely fine, this can be achieved by enlarging the image data display in the corresponding position of the electronic image information display. After the termination of the input of the editing commands, the editing position and editing contents are displayed on the electronic image information display 6 in the form of a distinguishable mark 25. A display unit may be provided for confirming the range of designation separately from the electronic image information display for incorporating the projected recording image. The electronic image information display used to confirm the range of designation need not necessarily be thin and phototransmissive and therefore various electronic image information displays such as CRT or the like may be utilized.

A group of switches 24 correspond to editing commands in the example of FIG. 7. However, symbols supplied to the coordinate input means may be substituted for the editing commands. FIG. 8 shows a group of symbols corresponding to the editing commands by way of example.

Figure 9:
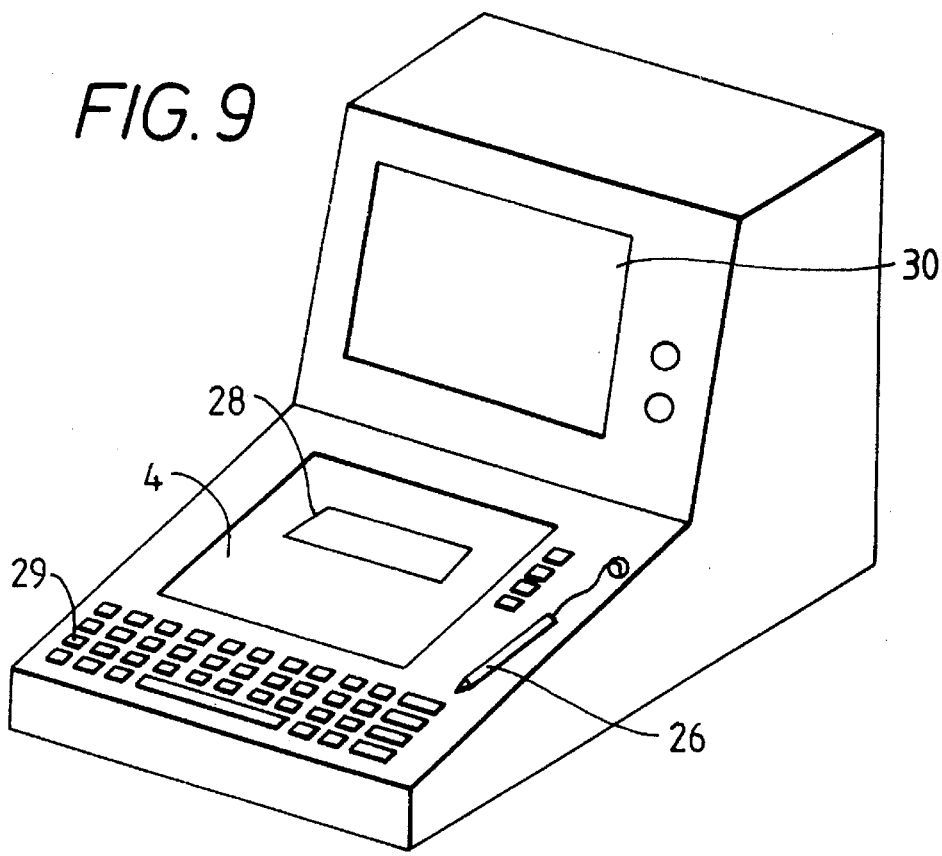
FIG. 9 shows a sheet processing apparatus being a fifth embodiment of the present invention.

FIG. 9 shows another embodiment of the present invention. In the embodiment of FIG. 9 there is an additional electronic image information display 30 in a different place within the apparatus separate from the window 4 for displaying the projected recording image and the electronic image information display that have been stacked up. With this arrangement, the additional electronic image information display 30 displays part of image information and the display area is so arranged in a suitable region as to be displayed 28 on the electronic image information display on the projected recording image in the window 4. The work necessitates editing an image while making certain of its variation such as image deformation in real time. By displaying the area in which the work is progressing as area display in the electronic image information display on the projected recording image in the display section, sophisticated editing work is facilitated while the preparation and balance of image information as a whole are taken into consideration.

If an apparatus according to the present invention is applied to a facsimile apparatus, a communication image can be confirmed as image information which is substantially as fine as a transmitted one and useless external recording can also be dispensed with. Moreover, the use of an apparatus according to the present invention may help to facilitate a teleconference via electronic data terminal equipment for the altering of static image information. Thus a sophisticated communication conference system is easy to establish. Also, the recording image may be achieved before it is printed by a printer on paper by attaching to the printer the apparatus according to the present invention. This prevents wrong information from being printed. Therefore, the apparatus according to the present invention contributes to reducing the amount of paper used, which is now considered a critical problem for the protection of the environment.

Figure 10:
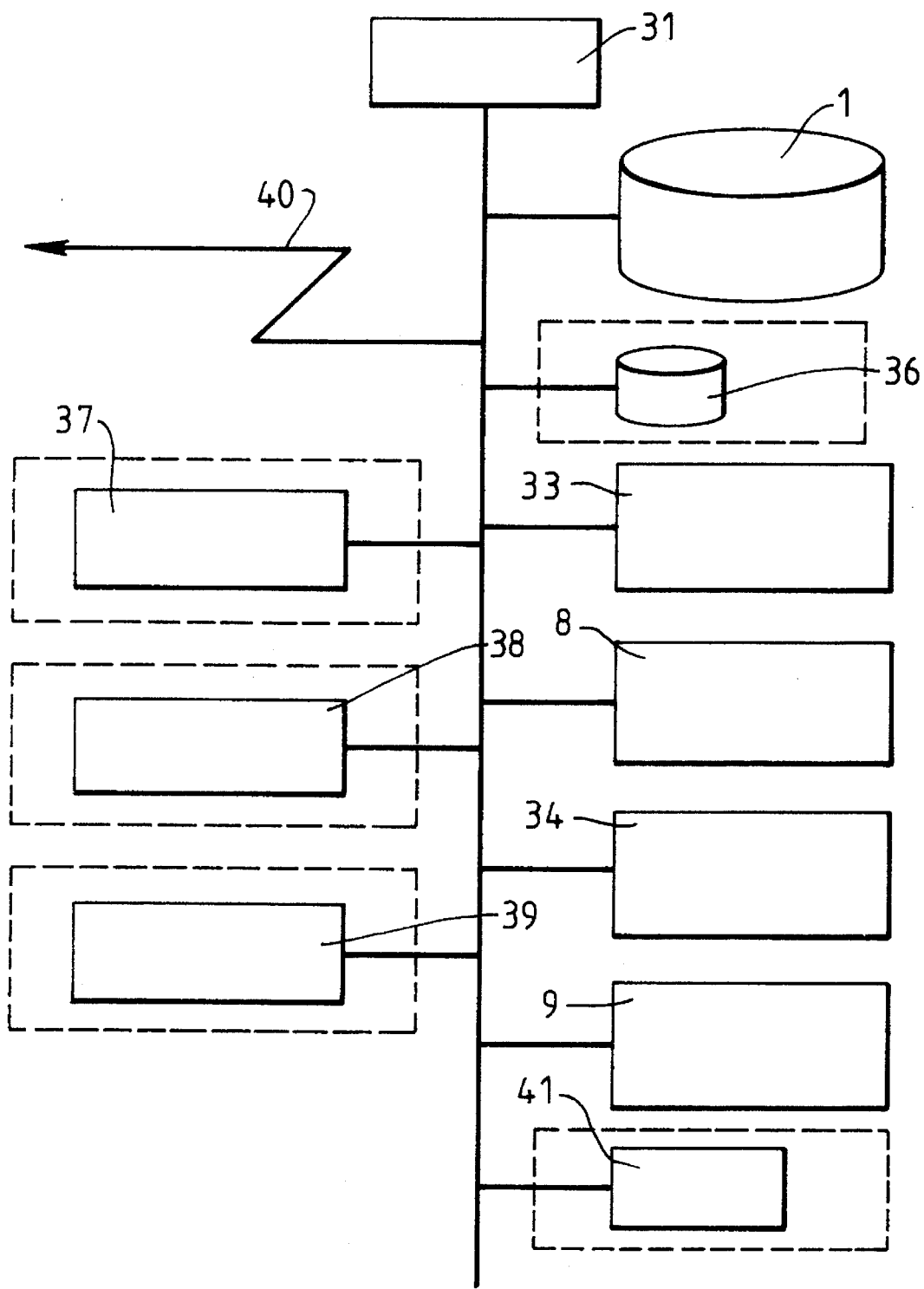
FIG. 10 is a block diagram of functional components and data flow in the embodiments of FIGS. 1 to 9.

FIG. 10 is a block diagram illustrating functional components and data flow in embodiments of the present invention. A system bus 32 of a CPU 31 for totally controlling the apparatus has connected thereto: the image memory 1 for storing print out data and editing information, a control means 33 for controlling the printing means 2 for converting the information in the image memory into printed information on a sheet the control means 8 for controlling the coordinate input unit 5 an editing information input means 34, the control means 9 for controlling the electronic image information display 6 and a sheet feeding control means 35 for controlling the feeding of a sheet by detecting the position of the recording sheet. The sensor 16 shown in FIGS. 3 and 4 for detecting stains on the sheet may also be connected to the system bus 33.

The memory may be a large capacity fixed memory such as a hard disk, or an optical disk or the like. The data in this memory 1 is written by information equipment internally or externally connected to the apparatus according to the present invention. In addition, it may be possible to transfer information to the apparatus by physically detaching and attaching the equipment therefrom and thereto.

The steps taken in an apparatus according to the present invention may include:

making a projected record based on the data in the image memory, conveying paper to the window 4 by the transport means 2a accepting editing information which has the two-dimensional coordinate input means and editing data, altering image information in the image memory according to the editing information, and displaying the altered contents by means of an electronic image information display. In order to accept complicated editing information or a plurality of editing data, it may be effective to use an editing data memory 36 for storing the editing information temporarily in addition to the image memory 1. When such an additional memory 36 is employed, any mistakes added to the editing information can readily be corrected.

The present invention may be used in conjunction with facsimiles, printers and scanners by connecting a facsimile control means 37, a printer control means 38 and/or a scanner control means 39 to the system bus 32 to exchange image information with the memory 1, respectively. The communication board of the facsimile, the projection mechanism of the printer and the read mechanism of the scanner may be physically integrated with the document processing apparatus of the present invention. Alternatively they may be separate, in other words, various combinations are possible.

In addition, any other information processing apparatus capable of dealing with electronic image information may be connected 40 to the system bus 33 An apparatus according to the present invention may also be connected to a plurality of input/output means such as facsimile apparatuses, printers, scanners or the like. In this case, a simple method of designating an information processing apparatus as a destination of transmission or reception of the image information in the image memory is to add a signal representing the attribute of the input/output equipment to the head or tail of the image information in the memory 1.

Figure 11:
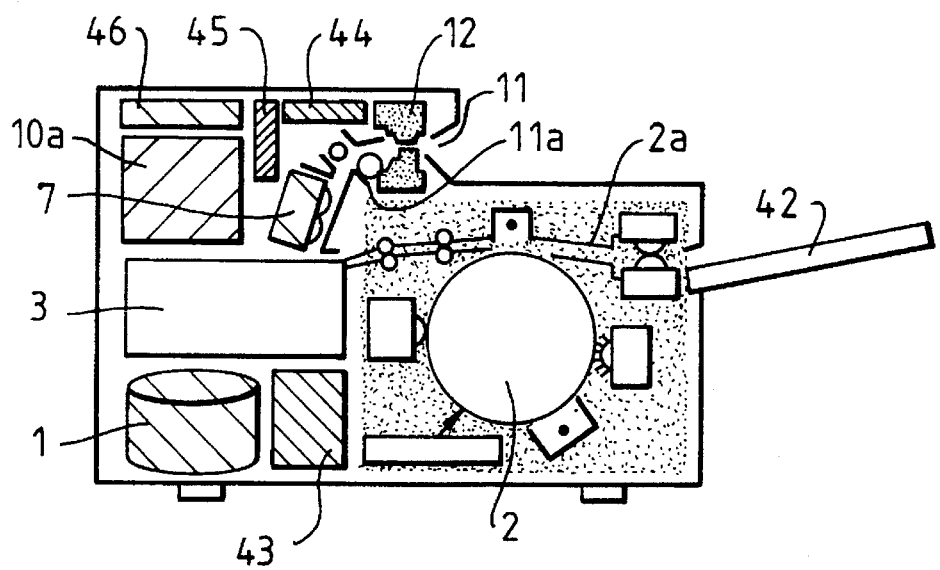
FIG. 11 shows a document processing apparatus as a sixth embodiment of the present invention.

In the embodiments described above, there was a window 4 in which a sheet, and any editing associated therewith, is displayed. However, at least some of the principles of the present invention may be applied to arrangements in which there is no such window 4, and FIG. 11 illustrates such an embodiment. In FIG. 11, parts which correspond to parts of the embodiments of FIGS. 1 to 9 are indicated by the same reference numerals. Thus, in FIG. 1, a sheet can be removed from a stacker 3 and transported by a suitable transport means 2a to a print mechanism 2 and from thence to a discharge tray 42. The information printed on the sheet by the print mechanism 2 is derived from the image data memory 1, with the print mechanism 2 being controlled by a controller 43. Furthermore, in a similar way to the embodiment of FIG. 2, a sheet carrying printed information may be input via a sheet inlet 11 and transported by suitable transport means 11a via an image information read unit 12 where the image information on the sheet is read, to image erasing means 7, and from thence to the stacker 3. The image information read unit 12 is controlled by a control unit 44, and the recording image erasing means 7 is controlled by a control means 45.

Thus, the image information read unit 12 can detect the information on the sheet (which may correspond to both print information and editing information) and transfer the data to the memory 1. The data may then be re-printed with, for example, the editing information used to produce a final version of printed information.

FIG. 11 also shows that the sheet processing apparatus may have a communication means 46, for transmitting information from the scanner 7 or from the memory 1 to a remote site, so that the communication means 46 may then correspond to the facsimile control means 37 in FIG. 10. A system controller 10a may also be provided for controlling the sequence of operation of the various components of the apparatus of FIG. 11.

If the embodiment of FIG. 11 is to be used for editing data already in the memory 1, that data may be printed on a sheet as print information, and transported from the print means 2 to the discharge tray 42, from which the sheet may be removed from the apparatus. The print information may then be edited, e.g. manually, and the sheet fed into the inlet 11 for the information to be read by the image information read unit 12, and the data transferred to the memory 1. The information on the sheet may then be erased by the erase means 7. Thus, this embodiment has the advantage that standard manual editing operations can be used and the window 4, transparent tablet 5 and transparent electronic image display 6 are not needed. The editing information may be input to the memory 1 automatically, rather than by e.g.

a keyboard, but this arrangement depends on the accurate reading of the editing information by the print image read means 12.

In the embodiments of the present invention described above, an image substantially equal in display quality to a print (or indeed, being a print in the embodiment of FIG. 11) is used for editing the electronic data, so that a high level human interface environment with electronic data equipment for dealing with static images is attained. Moreover, the operator is unlikely to suffer from fatigue even though work may continue for hours. Since the operator can gain information and convenience equal to those obtainable from a printed medium, unnecessary printings using paper can be reduced or eliminated and this is desirable in terms of environment protection.

As was previously mentioned, many different materials can be used to form the sheet or sheets to be used in the embodiments of the present invention previously described. Of course, the use of paper sheets is straight forward, since printing on paper is easy, and the final sheet is easy to handle. However, paper sheets are not convenient for repeated erasure of the information printed thereon. Therefore, as previously mentioned, the present invention has a second aspect, namely the use of a sheet formed by a polymer dispersed liquid crystal, and in particular, by a sheet having low molecular weight liquid crystal material dispersed in high molecular weight material, preferably high molecular weight liquid crystal material. This aspect of the present invention will now be discussed in detail. The following description will therefore discuss a macromolecule-liquid crystal memory film (self-holding liquid crystal film) and the recording operation using such a film same.

There are two kinds of macromolecule-liquid crystal memory films.

(a) A composite film in which low-molecular liquid crystal is dispersed in a high-molecular material.

(b) A composite film in which low-molecular liquid crystal is dispersed in a high-molecular liquid crystal material.

Figure 12:
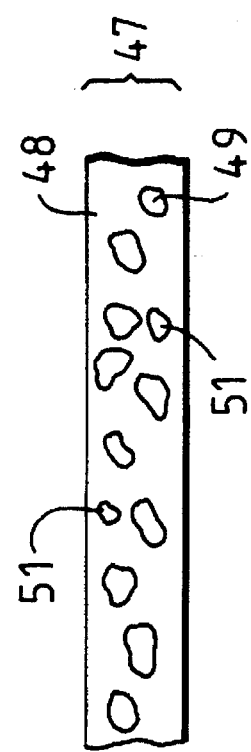
FIG. 12 shows the structure of a page which may be used in the present invention.

FIG. 12 illustrates the structure of the macromolecule—liquid crystal memory film 47. A low-molecular weight liquid crystal material 49 is dispersed in a high-molecular weight matrix 48. There are low-molecular and high-molecular materials liquid crystal materials which may be used the high-molecular matrix 14. Table 1 shows examples of such materials.

TABLE 1

| Items | | Basic composition |
|---|---|---|
| Macromolecule | Poly vinyl chloride (PVC) | $+\text{CHCH}_2+_n$ with Cl substituent |
| Low-molecular liquid crystal | DOBAMBC | $C_{10}H_{21}O$—⌬—CH=N—⌬—CH=CHCOCH$_2$CH$_2$H$_5$ (with C=O, CH$_3$, *) |
| | C-n | $C_nH_{2n+1}O$—⌬—CO—O—⌬—CO—O—CH$_2$—C*(H)(CH$_3$)—C$_2$H$_5$ |
| | CPHOB | $CH_3$+CH$_2$+$_5$—⌬—C(=O)—O—⌬—CN |
| | SOCB | $C_5H_{11}$—O—⌬—⌬—CN |
| High-molecular liquid crystal | PCPHS | $\left(-\text{Si}(\text{CH}_3)((\text{CH}_2)_5-\text{O}-⌬-\text{C}(=\text{O})-\text{O}-⌬-\text{CN})-\text{O}-\right)_n$ |
| | PMPPS | $\left(-\text{Si}((\text{CH}_2)_3-\text{O}-⌬-\text{C}(=\text{O})-\text{O}-⌬-\text{OCH}_3)-\text{O}-\right)_n$ |

To form such a film 49, a low-molecular liquid crystal such as a Schiff basic ferroelectric liquid crystal DOBAMBC and an ester ferroelectric liquid crystal and a high-molecular weight material are blended and the blend is cast on the surface of water in order to obtain a very thin film about 10 nm thick in which the liquid crystal has been dispersed in the high-molecular weight material. A plurality of such films then are laminated to form the final (composite) film 47.

Recording using the composite film 47 in which liquid crystal has been dispersed in the high-molecular material will be described. First, the composite film 47 is positioned between electrodes. Since the ferroelectric liquid crystal has spontaneous polarization, the state of molecular arrangement varies with the voltage polarity. Given the liquid crystal molecular pattern when a positive voltage is applied as a first state and when a negative voltage is applied as a second state, two states in which light from a light source is transmitted or blocked off can be obtained in dependence as the polarity of the voltage, by arranging two polarization plates in the orthogonal Nicol state on opposite sides of the composite film 47. Either of the two states of light can be chosen, depending on the arrangement of the polarization plates. For example, if the application of a positive voltage may be arranged to provide optical transmission and the application of a negative voltage may be arranged to provide blocking of light. AC voltage (or an electric field) is applied to the composite film 47 in which the low-molecular liquid crystal having ferroelectric properties has been dispersed in high-molecular material so as to determine the two states of optical transmission and optical interruption in accordance with the polarity (the direction in the case of electric field). When the composite film is 10 µm thick, only tens of volts of AC voltage need be applied.

The states of optical transmission and optical interruption are stably held even after the voltage or the electric field is erased and this is equivalent to a memory function. Then, the film can be removed from the electrodes and used as previously described. The electrodes will then replace the printing means 2 in the embodiments described above.

As an alternative, the composite film 47 can be made by blending one or more of the high-molecular liquid crystal materials and one or more of the low-molecular liquid crystal materials listed in Table 1.

Recording using such a film will now be described. First, the composite film 47 is positioned between electrodes. When a low-frequency of several Hz or a DC voltage is applied, ion conduction occurs and the turbulence of the main chain of the high-molecular liquid crystal molecule tends to make light scatter intensely. Consequently, the transmittivity of light through the composite film 47 is lowered substantially. When a high-frequency voltage of higher than tens of Hz is applied, the liquid crystal molecules assume a homeotropic orientation state (a fourth state) and high transmittivity is obtained.

When PMPPS in Table 1 is used as the high-molecular liquid crystal material and 5OCB is used as the low-molecular liquid crystal material, and these materials are blended, an induced smectic phase is shown in an area of a compound ratio ranging from 80/20–20/80 (mol %). For a compound ratio at 50/50 (mol %), response time is 10 ms when the voltage is 50 V.

When a voltage of 0.01 Hz is applied, the optical transmittivity is about 3% and when a voltage of 1 kHz is applied, the optical transmittivity is about 98%. With this arrangement and materials, the states of optical transmission and optical interruption are stably held even after the voltage or the electric field is erased and this is equivalent to a memory function as previously described.

Such a composite film 4T being a blend of low-molecular liquid crystal and the high-molecular liquid crystal, does not need polarization plates.

The optical interruption (optical turbulence) state is attainable by applying the low-frequency (DC) voltage or an electric field.

The voltage V applied to the composite film 47 corresponds to Q/C, where Q (coulomb/cm$^2$)=charge amount), and C (farad/cm$^2$)=the electrostatic capacity of the composite film 47. While a bias voltage Vb is supplied to the electrode 45b, a voltage of (Q/C–Vb) is to be applied to the composite film 1.

In the above discussion, it is assumed that electrodes were used to apply voltages on electric fields to the film 47. However, electrophotography utilized in, for example, a laser printer (LBP) may be used to form charged patterns corresponding to character and/or image information. In an LBP, a photosensitive drum charged with electricity is exposed to radiation according to an optical pattern corresponding to character and/or image information by means of a laser beam to form an extra fine electrostatic latent image on the drum and then charged toner sticks to the image to form a toner image.

However, a charge pattern corresponding to image information can be applied to the surface of the film 47 without using a developing agent by pressing the film 47 against the photosensitive drum with the electrostatic latent image formed thereon. Thus, very fine image information is writable on the film 47 in the state of optical interruption (scattering of light).

When the image information thus written is erased, it is necessary only to apply inversely polarized charge or voltage to the film 47.

Thus, the film 47 may be used to form the sheet used in the embodiments above without having to replace the printing means 2. Instead, that printing means may be in the form of a photosensitive drum so that an electrostatic latent image may be transferred therefrom to the sheet, which is formed of the high-molecular weight liquid crystal material and low-molecular weight material. If that high-molecular weight material is not a liquid crystal material, then polarization plates are needed at the window. It will also be appreciated that the film 47 can be used to form the endless belt 18.

Since an image can be formed on the sheet 47 using a photosensitive drum, it is possible to arrange for the apparatus of the embodiments previously described to print either on paper or on sheets formed from the film 47 by suitable control of the operation of the printing means 2. If the printing means 2 is to print on paper, toner needs to be transferred from the photosensitive drum to the paper, while no such toner is needed if the sheet is formed by the film 47.

However, sheets formed of film 47 then have other uses. Such sheets may be used in any such processing apparatus in which the sheet is removed from the printing means after information has been printed thereon. This is thus different from a normal liquid crystal display, in which the film is fixed permanently between electrodes.

Therefore, embodiments making use of sheets of film 47 will now be described.

Figure 13A:
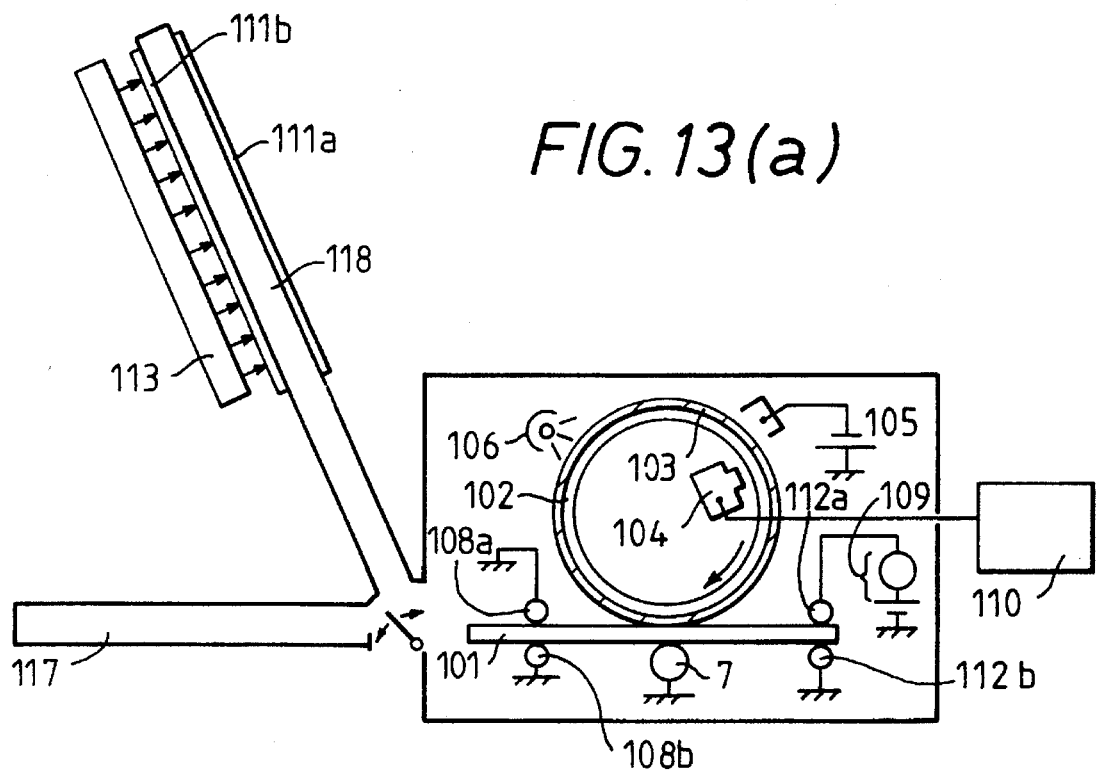
FIGS. 13(a) and 13(b) show a seventh embodiment of the present invention, FIG. 13(a) showing a sectional view through a document processing apparatus and FIG. 13(b) showing a page to be used in such a document processing apparatus.
Figure 13B:
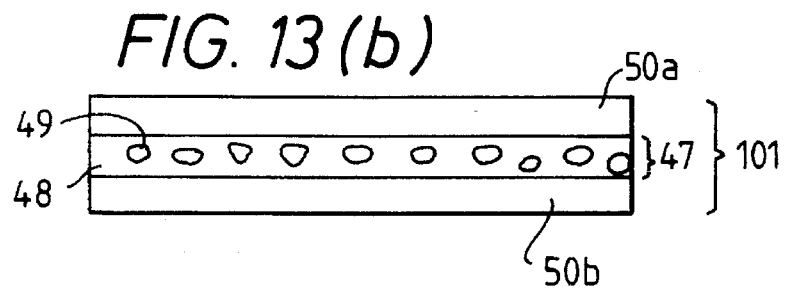

FIGS. 13(a) and 13(b) illustrate a first further embodiment of the present invention. FIG. 13(a) illustrates a recording apparatus and FIG. 13(b) illustrates the structure of the recording medium (sheet). As shown in FIG. 13(a), an OPC photosensitive layer 103 is applied to the surface of a tubular glass drum 102 with a transparent electrode formed on the surface thereof. The drum 102 has a built-in exposure unit 104 for radiating an optical pattern based on data from an image information source 110. A corona charger 105 is used to supply negative charge to the surface of the photosensitive layer 103 and then the exposure unit 104 is used to radiate the optical pattern, so that a charged pattern corresponding to characters image information is formed on the drum.

FIG. 13(a) also shows a deelectrifier (deelectrifying lamp) 106 and sheet 101 on which sheet information is to be recorded. The sheet 101 has protective layers 50a, 50b which are on either side of composite film 47. As previously described, film 47 has a high-molecular material 48 and a low-molecular liquid crystal 49 or a high-molecular liquid crystal 48 and low-molecular liquid crystal 49. The protective layers 50a and 50b (although not essential for recording information) should preferably be provided in practical use to protect the liquid crystal composite film 47 from mechanical damage and also deterioration due to moisture absorption. Plastic films of high transparency such as polyester films may be laminated to form the protective layer. When a composite film comprising the high-molecular liquid crystal and the low-molecular liquid crystal is used as the recording medium sheet, 50b need not be transparent as the scattering mode is utilized and the surface of layer 50b opposite to the sheet 101 can be created e.g. with white paint.

The sheet 101 is passed between rolls 112a, 112b connected to an initializing power supply 109. When the sheet 101 is a composite film comprising high-molecular material and a low-molecular liquid crystal material, a positive voltage is applied to the sheet 101, whereas when the sheet 101 is a composite film comprising high-molecular liquid crystal material and low-molecular liquid crystal material, a high-frequency voltage is applied to the sheet 101. In this way, any characters and/or image information already written on the sheet 101 are erased. Thus, the sheet 101 is initialized for use. Optically, a state of optical transmission is established.

Voltage V (=Q/C) corresponding to the print information is then supplied to the sheet 101 passed between the drum 103 (having a charged pattern Q corresponding to characters and/or image information on the surface thereof) and a transfer roller 107 at ground potential. The arrangement of the liquid crystal molecules changes to the state of optical interruption (the dark state) in the area where charge is present. Since the liquid crystal is ferroelectric and has a memory function, this state is held unless an inversely-polarized voltage is applied. The composite film 47 should receive approximately 50–70 V by making the composite film 10 μm thick (the film 47 comprising high-molecular material and low-molecular liquid crystal) making the protective layers 50a, 50b, 90 μm thick and setting the surface potential of the photosensitive layer at 700 V.

In order to prevent electrification after characters and/or image information are recorded, the sheet 101 may be set free from electric charge by making it pass between deelectrifying rolls 108a, 108b.

Stackers 117, 118 are provided for receiving sheets recorded with information and one or the other can be selectable by means of an output changeover switch (not shown) No polarization plates are required when the sheet 101 is a composite film comprising high-molecular liquid crystal and the low-molecular liquid crystal, but they are required when the recording medium sheet 101 is a composite film comprising high-molecular material and the low-molecular liquid crystal.

Therefore, the stacker 118 is intended to display information on the sheet 101 instantaneously when the sheet 101 is of a composite film comprising the high-molecular material and the low-molecular liquid crystal. The stacker 118 is provided with two polarization plates 111a, 111b in the orthogonal Nicol state on both sides of a transparent opening and an illumination light source 113 is also provided. Although FIGS. 13(a) and 13(b) show the use of a transparent photosensitive material as the photosensitive drum having the built-in exposure unit 104, it is possible to achieve a similar effect in a conventional system in which an inorganic or organic photosensitive layer is formed on the surface of an aluminum drum with an extend exposure unit such as a laser optical system, LED or the like.

Figure 14A:
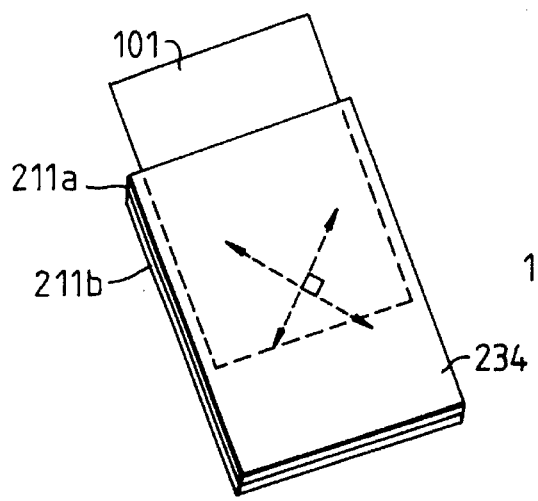
FIGS. 14(a) and 14(b) show a display unit which may be used with the document processing apparatus of FIG. 13(a)
Figure 14B:
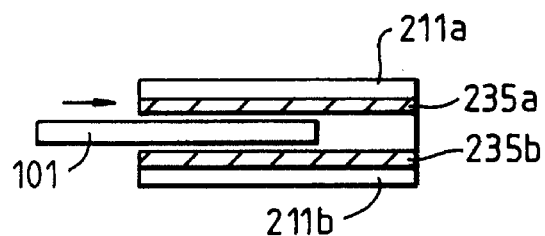

The sheet 101 discharged into the stacker 17 may be used directly if the high-molecular material is liquid crystal material. Even if it is not, a separate display device may be used. That display device is shown in FIGS. 14(a) and 14(b). The sheet 101 is held between two polarization plates (sheets) 111a, 111b in the orthogonal Nicol state to make the information thereon visible as shown in FIGS. 14(a) and 14(b). In FIG. 14(a) a file 234 has two polarization plates (sheets) 211a, 211b. As shown in FIG. 13(b) there are static electricity generation preventive layers 235a and 235b formed on each polarization plate (sheet) 211a, 211b in contact with the recording medium sheet 101 to prevent information being lost due to frictional charging at the time the sheet 101 is inserted in the file 234.

It may be noted the file 234 may be dispensed with if the protective layers 50a, 50b shown in FIG. 12(b) are polarization films with the polarization axes thereof mutually in the orthogonal Nicol state.

Figure 15:
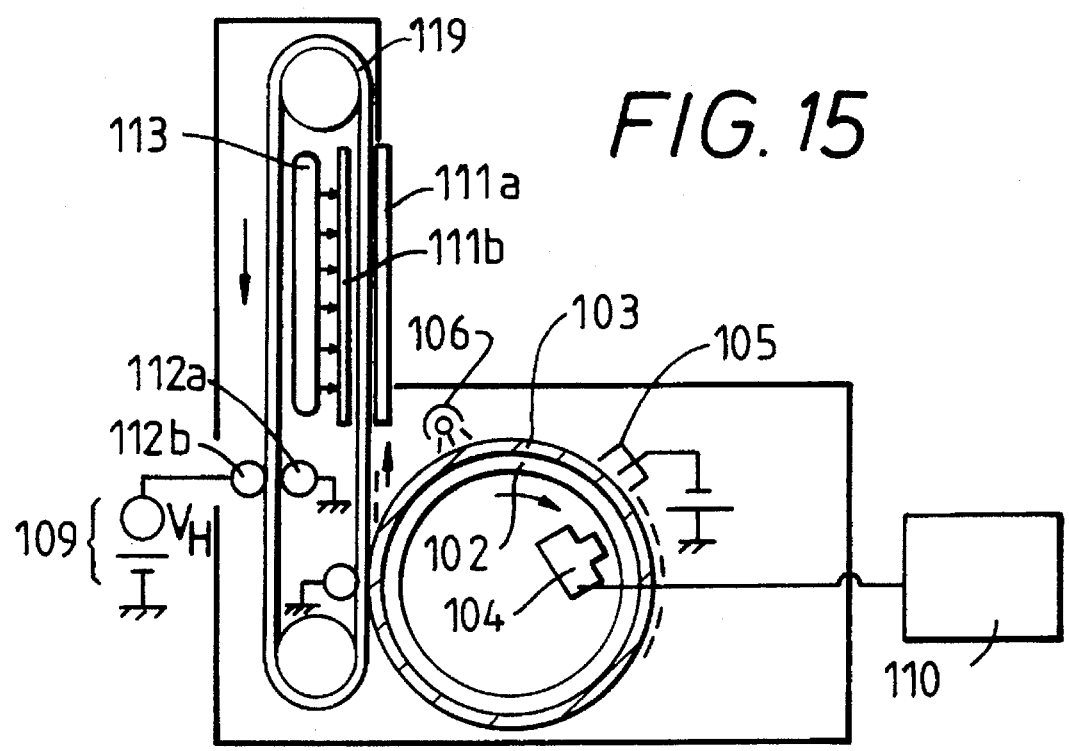
FIG. 15 shows a document processing apparatus as an eighth embodiment of the present invention.

FIG. 15 illustrates another embodiment of the present invention. In FIG. 15, the sheet is in the form of an endless belt 119. This makes it possible to provide a display capable of writing and erasing as a continuous operation. As this recording medium has a memory function, moreover, the information that has been written can be held even when the power supply is cut of. The endless belt 119 may be a composite film comprising the high-molecular liquid crystal and the ferroelectric low-molecular liquid crystal listed in Table 1 or a film comprising the high-molecular material and the ferroelectric low-molecular liquid crystal.

The embodiment of FIG. 15 has many components which correspond to components of the embodiment of FIGS. 13(a) and 13(b), and these corresponding components are indicated by the same reference numerals.

In FIG. 15 the endless belt 119 passes between rollers 112a, 112b connected to the initializing power supply 109. When the belt 119 is a composite film comprising the high-molecular material and the low-molecular liquid crystal, a positive voltage is applied to the roller 112b, whereas when the belt 119 is a composite film comprising the high-molecular liquid crystal and the low-molecular liquid crystal, a high-frequency voltage is applied to the roller 112b. In this way, a state of optical transmission is established, and the characters and/or image information already written on the belt 119 are erased. Thus, the belt 119 is initialized.

A voltage distribution V (=Q/C) corresponding to the image information is supplied to the recording medium belt 119 passed between the drum 103 (having a charged pattern Q corresponding to characters and/or image information) and a transfer roller 107. The arrangement of the liquid crystal molecules changes to the state of optical interruption (the dark state) in the area where the charge is present. When this area arrives at a flat light source 113, the characters and/or image information thus written are module visible. Thus, in this embodiment the stacker 118 in FIG. 13(a) is incorporated into the apparatus so that the belt 119 passes therethrough.

As set forth previously, when the belt 119 is a composite film comprising high-molecular material and the low-molecular liquid crystal, polarization plates 1111a, 111b are needed at a position corresponding to a flat light source 113 such that the belt 119 passes therebetween.

Image information is continuously written and erased by moving the belt 119 so that continuous display can be carried out. Since the liquid crystal is ferroelectric and has a memory function, this state is held unless the inversely-polarized voltage is applied even though the power is cut off.

Although FIG. 15 again shows the use of a transparent photosensitive material for as the photosensitive drum having a built-in exposure unit 104 it is again possible to achieve a similar effect in a conventional system in which an inorganic or organic photosensitive layer is formed on the surface of an aluminum drum with an external exposure unit such as a laser optical system, LED or the like.

The belt 119 can be similar to an ordinary plastic film, those of AO size in width may also be used. Moreover, electrostatic wide print heads of AO size are being used in electrostatic plotters. Therefore, the electrostatic wide print head may be used to display a large picture plane of AO size which is as fine as 50 dots/mm and may also be applied to public display plates using static pictures.

If the endless belt 119 is a composite film in which liquid crystal has been dispersed in high-molecular material or the low-molecular liquid crystal has been dispersed in the high-molecular liquid crystal material, a color display is possible by mixing dichromatic coloring matter 51 (see FIG. 13b) with the liquid crystal.

Figure 16:
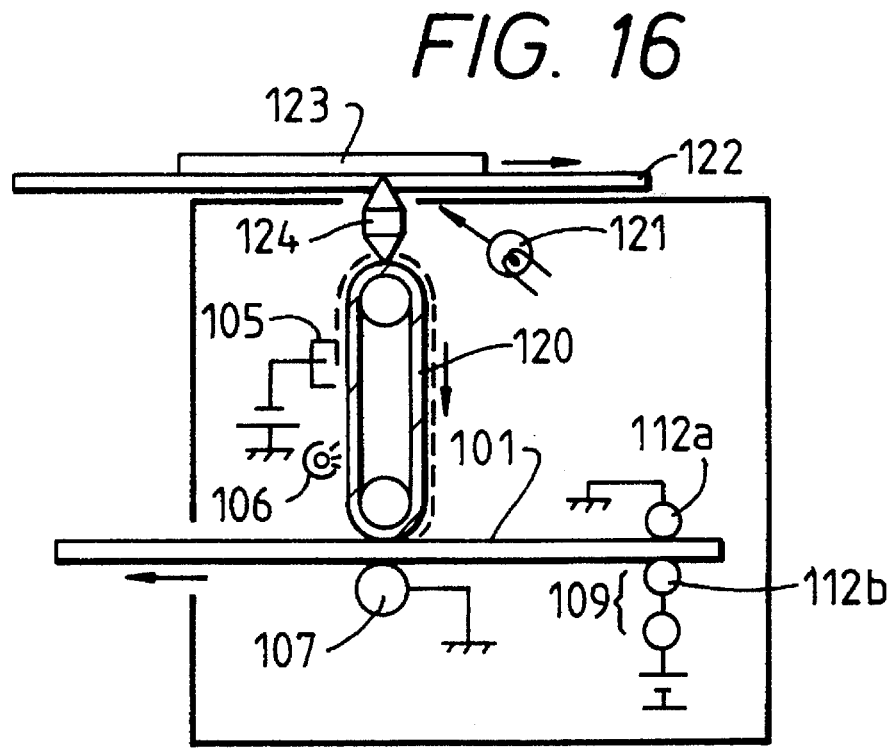
FIG. 16 shows a document processing apparatus as a ninth embodiment of the present invention.

Further, a multicolor display is also possible by stacking a plurality of belt-like light modulation members having the liquid crystal mixed with different kinds of dichromatic coloring matter FIG. 16 illustrates another embodiment of the present invention. The embodiment of FIGS. 13a and 13b can be considered to be a printer and the embodiment of FIG. 15 can be considered to be a display. The embodiment of FIG. 16 can be considered to be a copier. Again, corresponding parts are indicated by the same reference numerals.

A photosensitive belt 120 is uniformly charged by a corona charger 105. The original 123 to be copied is mounted on a plate 122. Also shown in FIG. 16 is a fluorescent lamp 121, which acts as an exposure light source and is e.g. a halogen lamp, and a self-focusing lens 124. When the light reflected from the original 123 is reaches the photosensitive belt 120, a charged pattern Q is formed corresponding to character and/or image information from the original 123.

The information may then be recorded on the sheet 101 in the same way as in the embodiment of FIGS. 13a and 13b and therefore will not be described further. The sheet 101 is again a composite film comprising high-molecular material and low-molecular liquid crystal or comprising high-molecular liquid crystal and low-molecular liquid crystal.

The sheet 101 with character and/or image information thereon may be used for presentation by means of an overhead projector (OHP).

Figure 17:
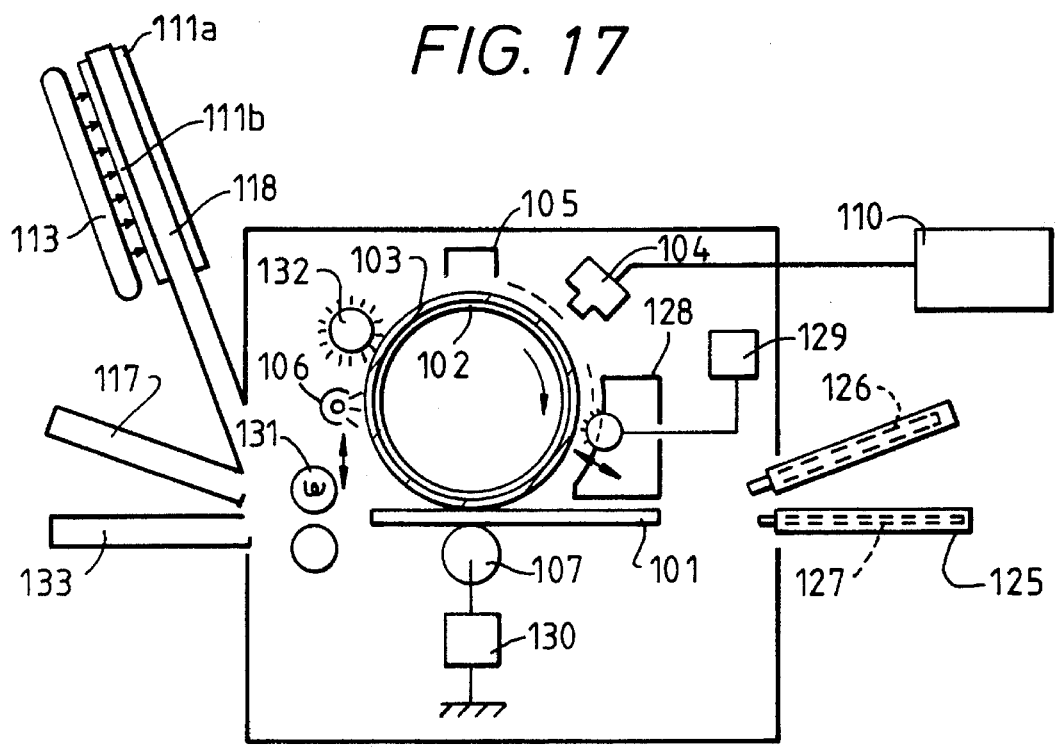
FIG. 17 shows a document processing apparatus as a tenth embodiment of the present invention.

FIG. 17 illustrates another embodiment of the present invention. Again, components corresponding to components of the embodiment of FIGS. 13(*a*) and 13(*b*) are indicated by the same reference numerals.

In a conventional electrostatic recording apparatus such as a LBP a charged pattern corresponding to characters and/or image information is formed on a photosensitive material, toner is made to stick to the photosensitive material to prepare a toner image corresponding to the charged pattern in a developing unit, and the toner image is transferred to paper. In the embodiment of FIG. 17, a hopper 125 for storing copying materials 127 (paper) to which the toner image is transferred and another hopper 126 for storing the initialized sheet 101 are provided (the composite film comprising high-molecular material and low-molecular liquid crystal or comprising the high-molecular liquid crystal and low-molecular liquid crystal).

There is a developing unit 128 having a retract mechanism (not shown) and a developing bias voltage regulating mechanism 129. The selection of either hopper 125, 126 is based on a signal from a data processing unit such as a computer and when the sheet 101 is selected, the developing unit 128 may be retracted from the photosensitive drum to apply an inverse bias with respect to the developing bias voltage in order to prevent toner from sticking to the surface of the photosensitive material. A transfer power supply 130 connected to a transfer roller 107 is set at the ground potential.

Information may then be recorded on the sheet 101 in the same way as in the embodiment of FIGS. 13(*a*) and 13(*b*).

When the hopper 125 is selected, on the other hand, the developing unit 128 is released from the retracted condition so that the developing bias voltage is a forward bias voltage. This causes toner to stick to the surface of the photosensitive material and the inversely-polarized voltage against the toner charge is applied to the transfer power supply 130 connected to the transfer roller 107. Hence, a toner image corresponding to the characters image information on the photosensitive drum is transferred. Then the toner passed through a fixing unit 131 is caused to stick onto the surface of the copying material 127 before being discharged into a stacker 133.

With this arrangement, data may first be recorded on the reloadable erasable sheet 101, which is discharged into the stacker 118 having a display monitor function. After the contents of a recording is confirmed, the data may be printed on the copying material 127, if no problem arises. It thus becomes possible to reduce consumption of copying material (paper).

The embodiments of FIGS. 13 to 17 use elecrophotography to write information on the sheet 101 forming a charged pattern corresponding character and/or image information on photosensitive material and providing the charged pattern for the recording medium sheet. As shown in FIGS. 18(*a*) and 18(*b*), on the other hand, information may be written by providing a charge for the sheet 101 by means of an ion printer which generates a charged pattern corresponding to character and/or image information. FIG. 18(*b*) illustrates a method of erasing information written and FIG. 13(*a*) a method of writing new information.

The ion print head may be one known in the prior art (e.g. from U.S. Pat. No. 4,538,163). The corona charge (the negative charge in this case) flow generated in the corona wire 137 of a corona charger 105 is controlled by a group of pulse voltages applied to a group of small electrodes constituting a modulation electrode 138 in order to generate a charge pattern corresponding to characters and/or image information. The control pulse voltage is generated by a pulse voltage generating source 139 connected to the image information source 10.

FIGS. 18(*a*) and 18(*b*) show a moving plate 142 set at the ground potential. A composite film 141 for use in this case includes a transparent electrode film 140 deposited by evaporation on one surface of the sheet 101. The reason for the formation of the electrode film 140 is to improve the electrical contact between the recording medium sheet and the moving plate 142. The voltage applied to the corona wire can be switched by a switch terminal 136 for switching the positive power supply to the negative one and vice versa.

Figure 18A:
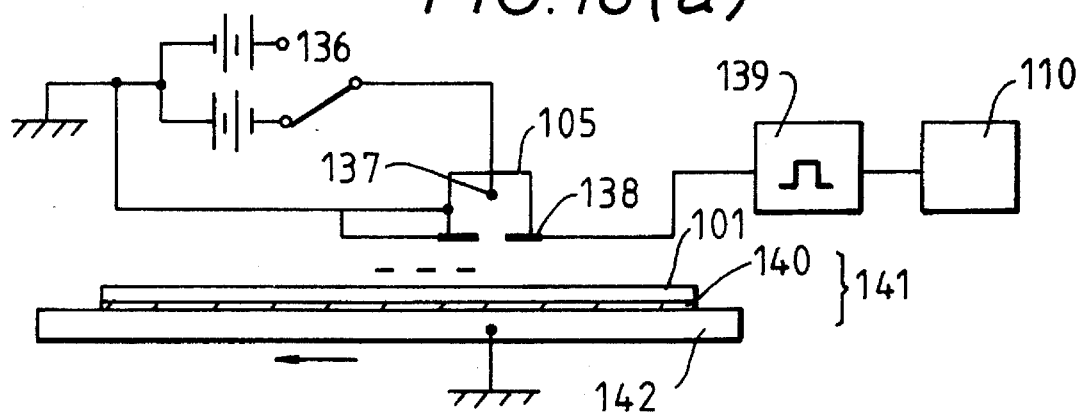
FIGS. 18(a) and 18(b) show schematically the basic structure of a document processing apparatus of a eleventh embodiment of the present invention, FIG. 18(a) corresponding to an erasure of a page and FIG. 18(b) corresponding to writing on the page.
Figure 18B:
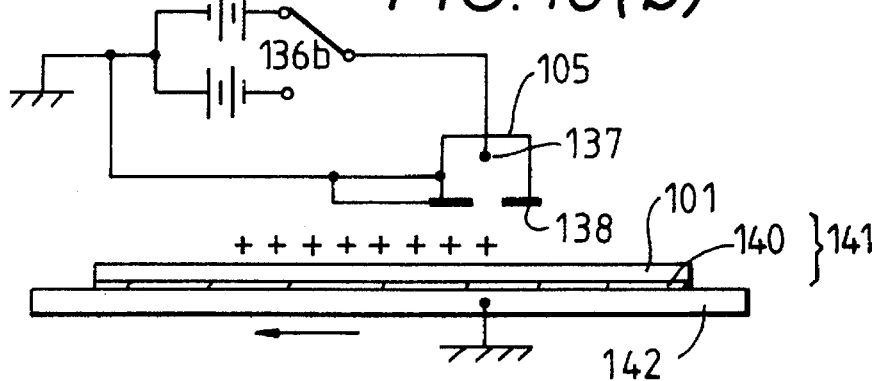

The negative power supply is connected when information is rewritten as shown in FIG. 18(a). As a result, a charge pattern correspond to characters and/or image information is formed on the recording medium sheet and the arranged state of the liquid crystal molecules changes to the state of optical interruption (the dark state) in the area where the charge is present, so that characters and/or image information are recorded on the sheet 101. Since the liquid crystal is ferroelectric and has a memory function, this state is held unless an inversely-polarized voltage is applied.

A positive power supply is connected to apply voltage to the corona wire when the written information is erased, whereby the inversely-polarized positive charge is applied to the sheet 101 so as to erase the written information.

Although the resolution of recording images is inferior to the embodiments of FIGS. 13 to 15 the apparatus may be smaller in size because the photosensitive material can be omitted.

The use of an electronic line drawing device as another application example has the effect of supplying the negative charge, as electrons can be radiated.

Figure 19:
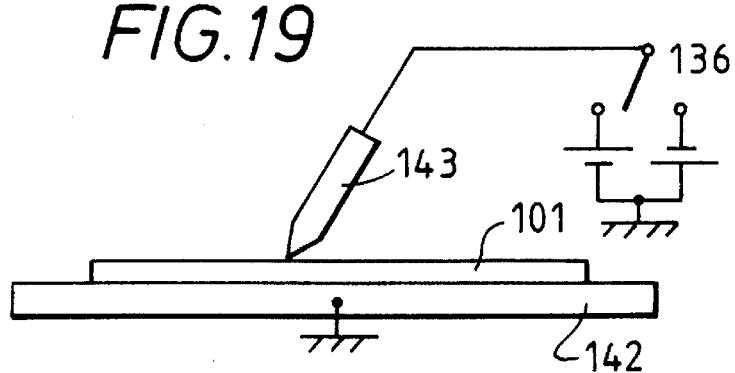
FIG. 19 is a schematic view of a twelfth embodiment of the present invention.

FIG. 19 illustrates another embodiment of the present invention. Although the methods of writing character and/or image information previously described rely on the provision of the charged pattern on the surface of the recording medium sheet, part of character and/or image information may need modification as occasion demands. In this case, use can be made of a voltage application pen 143 connected to a power supply fitted with a positive-to-negative switching terminal 136 at one end. The sheet 101 with is placed on the plate 142 set at ground potential. First, a positive or high-frequency voltage is applied to a part to be erased to make it optically transparent (erasure) and then a negative or low-frequency voltage is applied thereto, so that image information is written. FIG. 19 shows the power supply with the use of a composite film comprising the high-molecular material and the low-molecular liquid crystal as the recording medium sheet. When a composite film comprising the high-molecular liquid crystal and the low-molecular liquid crystal is used as the recording medium sheet, both high- and low-frequency power supplies are employed.

Figure 20:
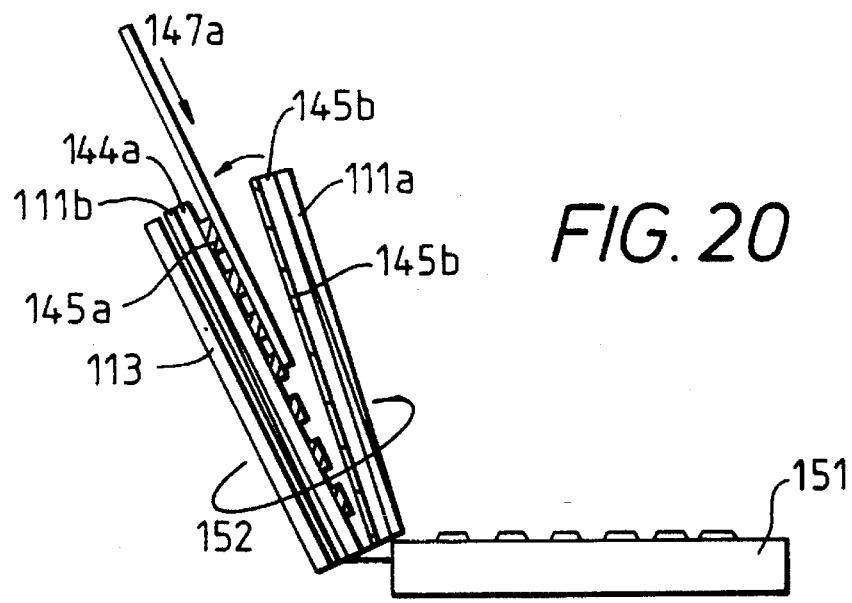
FIG. 20 shows a document processing apparatus as a thirteenth embodiment of the present invention.

FIG. 20 illustrates another embodiment of the present invention. There are two drive systems for use in liquid crystal displays: a simple matrix system and an active matrix system using a switching element such as TFT (a thin film transistor).

FIG. 20 shows, transparent substrates of 144a, 144b of glass, and pixel electrodes 145a, 145b. The substrates 144a, 144b with the pixel electrodes 145a, 145b formed on their respective surfaces are used in the simple matrix system. On the other hand, pixel electrodes, gate electrode lines, signal electrode lines and TFT are formed (though not shown in FIG. 20) on the substrates in the active matrix system. Also shown are polarization films 111, and a light source 113.

Normally, two substrates are held a predetermined space apart from each other in a liquid crystal display and a low-molecular liquid crystal is enclosed therebetween to form an integral body. However, the liquid crystal film 47 or the recording medium sheet 101 may be inserted in between two substrates to build a sandwich structure 152 and then image information may be written by inputting data using a keyboard 151 similar to an ordinary display.

Since a ferroelectric smectic liquid crystal normally has a memory function, the written image information will be held even though the liquid crystal film 47 or the sheet 101 is taken out after the sandwich construction is opened.

When part of the information is rewritten or when new information is written to the whole area, the same operation should be repeated after such a liquid crystal film 47 or a sheet 101 is reinserted. When data is written accurately at high speed, an active matrix system using TFT is preferred.

Figure 21:
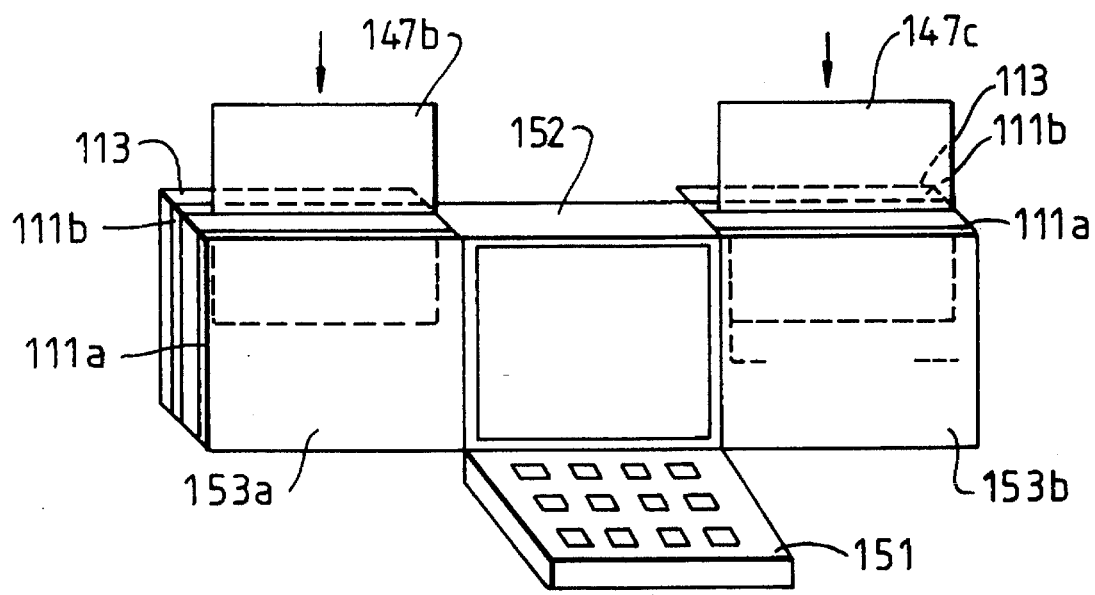
FIG. 21 shows a document processing apparatus as a fourteenth embodiment of the present invention.

FIG. 21 illustrates another embodiment of the present invention. As the amount of information that can be displayed on a display is limited, an attempt to scan the preceding pages while documents are being prepared by means of a wordprocessor or the like may be met by displaying them on the screen by scrolling. However, it is impossible to scan a plurality of pages at the same time. The embodiment of FIG. 21 is intended to provide a method of solving the problem described above by arranging a monitor unit comprising two polarization films and a light source on one side of the image recording apparatus. Thus, the contents in the preceding pages are first read from e.g. floppy disk and then the contents are written to the liquid crystal display 152 or the sheet 147b, 147c in the same way as in FIG. 20 The liquid crystal display 152 or the sheet 147b, 147c is inserted into the monitors 153a, 153b, so that information of a plurality of pages can be viewed simultaneously.

TABLE 2

| System Performance | Liquid crystal display | Printer (Laser printer) | Invention |
|---|---|---|---|
| Writing & erasure of characters image information (reversible) | o | x (Toner image) | o |
| Maneuverability of recording medium | x Integration of display and drive unit | o Feeling of paper (Separated from recording apparatus) | o Feeling of film (Separated from recording apparatus) |
| Resolution | ~10 dots/mm | ~40 dots/mm | ~40 dots/mm |

Table 2 shows a comparison between a sheet processing apparatus according to the present invention, a conventional liquid crystal display and a laser printer. As is evident from Table 2, a sheet processing apparatus according to the present invention has the function of writing and erasing information, as occurs in a liquid crystal display but also has excellent maneuverability.

Use of a 147b, 147c of this type has the following advantages.
(1) The sheet 101 may be a plastics sheet approximately 0.1 mm thick and include no photoconductive layer member so that it may be stored in the light.
(2) Characters and/or image information can be written and erased a number of times.
(3) Characters and/or image information can be finely recorded with a density as high as 10~50 dots/mm.

(4) As the sheet is transparent, it may be used as a sheet for display and OHP. In addition, a recording medium sheet of large size, e.g. AO size is usable fox public notifying purposes.

(5) As the recording medium sheet has a memory function, the written information can be maintained for a long period of time.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A sheet processing apparatus, comprising:

at least one recording sheet for carrying print information thereon;

memory means for storing print data corresponding to said print information;

a window;

support means for supporting said at least one recording sheet such that said print information is visible in said window;

an editing unit for inputting editing data;

an editing display associated with said window for displaying said editing data at a selected part of said window corresponding to a part of said print information on said at least one recording sheet; and data editing means for editing part of said print data corresponding to said part of said print information in response to said inputting of said editing data to said editing display.

2. A sheet processing apparatus according to claim 1 further comprising, print means for printing said print information; and transport means for transporting said at least one recording sheet from said print means to said support means.

3. A sheet processing apparatus according to claim 2, further comprising erasing means for erasing said print information, said transport means being arranged to transport said at least one recording sheet from said support means to said erasing means.

4. A sheet processing apparatus according to claim 2, further comprising:

a storage means for storing said at least one recording sheet; and wherein said at least one recording sheet comprises a plurality of recording sheets, and said transport means is arranged to transport said plurality of sheets successively to said printing means from said storage means.

5. A sheet processing apparatus according to claim 4, further comprising output means for outputting at least one selected sheet of said plurality of recording sheets from said transport means.

6. A sheet processing apparatus according to claim 5, further comprising means for detecting a stain on any of said plurality of recording sheets, wherein said at least one selected sheet corresponds to any of said plurality of recording sheets having a stain thereon.

7. A sheet processing apparatus according to claim 5, further comprising means for counting a number of times any of said plurality of sheets is transported to said support means, wherein said at least one selected sheet corresponds to any of said plurality of sheets for which the counted number of times corresponds to a predetermined number.

8. A sheet processing apparatus according to claim 1, further comprising scanning means for scanning said at least one recording sheet, to thereby read said print information, to generate said print data, and to transmit said print data to said memory means; and transport means for transporting said at least one recording sheet from both said scanning means and said support means.

9. A sheet processing apparatus according to claim 1, further comprising:

print means for printing said print information;

erasing means for erasing said print information; and drive means for driving said at least one recording sheet, wherein said at least one recording sheet comprises an endless belt, said endless belt extending from said print means to said support means, from said support means to said erasing means, and from said erasing means to said print means.

10. A sheet processing apparatus, comprising:

at least one recording sheet for carrying print information thereon;

memory means for storing print data corresponding to said print information;

a window;

support means for supporting said at least one recording sheet such that said print information is visible in said window;

an editing unit for inputting editing data;

an editing display associated with said window for displaying said editing data at a selected part of said window corresponding to a part of said print information on said at least one recording sheet;

data editing means for editing part of said print data corresponding to said part of said print information in response to said inputting of said editing data to said editing display;

print means for printing said print information;

erasing means for erasing said print information;

drive means for driving said recording sheet;

wherein said at least one recording sheet comprises an endless belt, said endless belt extending from said print means to said support means, from said support means to said erasing means, and from said erasing means to said print means; and means for detecting a stain on said endless belt and for generating a belt replacement signal on detection of said stain.

11. A sheet processing apparatus according to claim 9, further comprising means for counting a number of rotations of said endless belt due to said drive means and for generating a belt replacement signal when the counted number of rotations corresponds to a predetermined number.

12. A sheet processing apparatus according to claim 1, wherein said at least one recording sheet is made of paper.

13. A sheet processing apparatus according to claim 1, wherein said at least one recording sheet comprises a composite film having low molecular weight liquid crystal material dispersed in high molecular weight material.

14. A sheet processing apparatus according to claim 1, wherein said editing display comprises a liquid crystal display.

15. A sheet processing apparatus according to claim 1, wherein said editing display comprises a CRT display.

16. A sheet processing apparatus according to claim 1, wherein said editing display is located below said support means, and said at least one recording sheet is translucent.

17. A sheet processing apparatus according to claim 1, wherein said editing display is located below said support means, and said at least one recording sheet is transparent.

18. A sheet processing apparatus according to claim 1, wherein said editing unit comprises a transparent tablet, a pen, and means for detecting a location of said pen relative to said transparent tablet.

19. A sheet processing apparatus according to claim 18, wherein said transparent tablet is located over said support means.

20. A sheet processing apparatus according to claim 1, wherein said editing means comprises a keyboard.

21. A sheet processing apparatus, comprising:
at least one recording sheet for carrying print information thereon;
a memory for storing print data therein;
print means for printing said print information on at least a part of said at least one recording sheet based on said print data;
transport means for transporting said at least a part of said at least one recording sheet from said print means, said print information being able to generate editing data;
scanning means for scanning said at least a part of said at least one recording sheet to thereby read said print information and said editing data and for editing said print data in said memory based on said editing data; and
erasing means for erasing said print information from said recording sheet; wherein
said transport means is arranged to transport said at least part of said at least one recording sheet from said scanning means to said erasing means.

22. A sheet processing apparatus according to claim 21 further comprising:
storage means for storing said at least one recording sheet, wherein said at least one recording sheet comprises a plurality of recording sheets, and
said transport means is arranged to transport said plurality of recording sheets successively from said storage means to said print means.

23. A sheet processing apparatus according to claim 21, wherein said at least one recording sheet comprises a composite film having low molecular weight liquid crystal material dispersed in high molecular weight material.

24. A sheet processing apparatus, comprising:
at least one recording sheet, said at least one recording sheet comprising a composite film having low molecular weight liquid crystal material dispersed in high molecular weight material;
recording means for applying electric fields to at least a part of said at least one recording sheet, to thereby record information on said at least a part of said at least one recording sheet;
a window;
support means for supporting said at least one recording sheet such that said information is visible in said window; and
modifying means for inputting modifying data to said information, thereby displaying the modifying data at a selected part of said window corresponding to a part of said information on said at least one recording sheet.

25. A sheet processing apparatus according to claim 24, wherein said high molecular weight material is high molecular weight liquid crystal material.

26. A sheet processing apparatus according to claim 24, wherein said at least one recording sheet has a protective film in at least one side thereof.

27. A sheet processing apparatus according to claim 24, wherein said recording means comprises means for applying a charge pattern to said at least a part of said at least one recording sheet, to thereby record said information.

28. A sheet processing apparatus according to claim 24, further comprising erasing means for erasing said information from said at least one recording sheet, said erasing means including means for applying a further charge pattern to said at least a part of said at least one recording sheet, said further charge pattern being of opposite polarity to said applied electric fields, to thereby erase said information from said at least one recording sheet.

29. A sheet processing apparatus according to claim 28, wherein said recording means comprises means for applying a voltage pattern to said at least a part of said at least one recording sheet, to thereby record said information.

30. A sheet processing apparatus according to claim 24, further comprising erasing means for erasing said information from said at least one recording sheet, said erasing means including means for applying a further voltage pattern to said at least a part of said at least one recording sheet, said further voltage pattern being of opposite polarity to said applied electric fields, to thereby erase said information from said at least one recording sheet.

31. A sheet processing apparatus according to claim 24, having erasing means for erasing said information from said at least one recording sheet.

32. A sheet processing apparatus according to claim 30, wherein said erasing means comprises means for applying an alternating voltage to said at least one recording sheet.

33. A sheet processing apparatus according to claim 29, wherein said at least one recording sheet comprises an endless belt extending from said recording means to said erasing means and from said erasing means to said recording means, and said apparatus further includes means for removing said at least a part of said at least one recording sheet comprises drive means for said endless belt.

34. A sheet processing apparatus according to claim 24, wherein said high molecular weight material is provided with liquid crystal material.

35. A sheet processing apparatus according to claim 24, wherein said at least one recording sheet includes a protective film on at least one side thereof.

36. A sheet processing apparatus, comprising:
at least one recording sheet, said at least one recording sheet comprising a composite film having low molecular weight liquid crystal material dispersed in high molecular weight material;
recording means for applying electric fields to at least a part of said at least one recording sheet, to thereby record information on said at least a part of said at least one recording sheet; and
means for removing said at least a part of said at least one sheet from said recording means after said information has been recorded thereon,
wherein said recording sheet further includes dichromatic coloring material.

37. A facsimile apparatus, comprising:
at least one recording sheet for carrying print information thereon;

memory means for storing print data corresponding to said print information;

a window;

a support means for supporting said at least one recording sheet such that said print information is visible in said window;

an editing unit for inputting editing data;

an editing display associated with said window and said editing unit for displaying said editing data at a selected part of said window corresponding to a part of said print information on said at least one recording sheet;

data editing means for editing part of said print data corresponding to said part of said print information in response to said inputting of said editing data to said editing display; and transmission means for transmitting said print data between said memory means and a remote location.

38. A facsimile apparatus, comprising:

at least one recording sheet for carrying print information thereon;

a memory for storing print data therein;

print means for printing said print information on at least a part of said at least one recording sheet based on said print data;

transport means for transporting said at least a part of said one recording sheet from said print means, said print information being able to generate editing data;

scanning means for scanning said at least a part of said at least one recording sheet to thereby read said print information and said editing data and for editing said print data in said memory based on said editing data;

erasing means for erasing said print information from said recording sheet, wherein said transport means is arranged to transport said at least part of said at least one recording sheet from said scanning means to said erasing means; and transmission means for transmitting said print data between said memory and a remote location.

39. A facsimile apparatus, comprising:

at least one sheet, said at least one sheet being a composite film having low molecular weight liquid crystal material dispersed in high molecular weight material;

print means for applying electric fields to at least a part of said at least one sheet, to thereby print information on said at least a part of said at least one sheet;

means for removing said at least a part of said at least one sheet from said print means after printing said print information thereon;

a memory means for storing print data corresponding to said print information; and transmission means for transmitting said print data between said memory means and a remote location.

40. A sheet processing apparatus, comprising:

at least one recording sheet, said at least one recording sheet comprising a composite film having low molecular weight liquid crystal material dispersed in high molecular weight material;

recording means for applying electric fields to at least a part of said at least one recording sheet, to thereby record information on said at least a part of said at least one recording sheet, wherein said recording means comprises two transparent substrates having pixel electrodes thereon, and said information are input by a keyboard connected to the substrates after said at least one recording sheet is inserted between the two substrates;

a window;

support means for supporting said at least one recording sheet such that said information is visible in said window; and modifying means for inputting modifying data to said information, thereby displaying the modifying data at a selected part of said window corresponding to a part of said information on said at least one recording sheet.

* * * * *